United States Patent Office 3,539,654
Patented Nov. 10, 1970

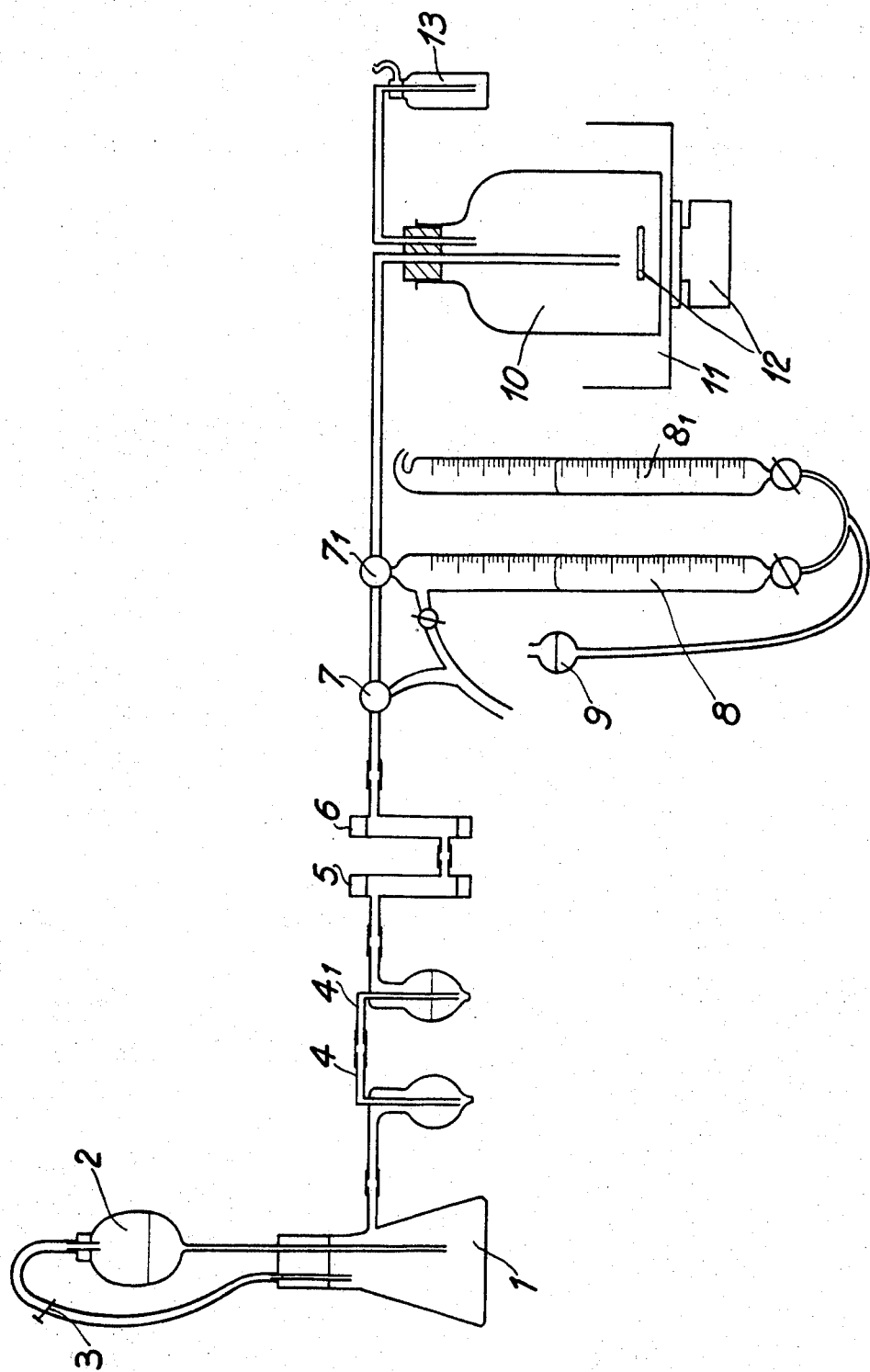

3,539,654
METHOD OF MODIFYING NATURAL RUBBER WITH CARBON MONOXIDE AND COREACTANT
René Pautrat and Roland Cheritat, Paris, France, assignors to Societe Auxiliare de l'Institut Francais du Caoutchouc, Paris, France
Filed May 16, 1967, Ser. No. 638,902
Int. Cl. C08c 5/00, 5/06, 13/00
U.S. Cl. 260—768
9 Claims

ABSTRACT OF THE DISCLOSURE

A mixture of a natural or synthetic rubber and a solvent for carbon monoxide is reacted with carbon monoxide and eventually a co-reactant, in an inert atmosphere and in the presence of a catalyst, the carbon monoxide being first dissolved into said mixture kept to this purpose at a low temperature and the resulting reaction mixture being subsequently heated under pressure to produce the reaction. The modified polymers are elastomeric, resinous or fibrous and may be used to make elastomeric articles and coatings, varnishes and paints, glues, fabrics.

BACKGROUND OF THE INVENTION

The reactions of carbon monoxide with the unsaturated, low molecular-weight compounds are well known, notably those consisting in fixing a $CO+H_2$ mixture on the olefin under the conditions of an oxo synthesis, i.e. with high temperature and pressure values. On the other hand, little investigations have so far been made in the combinations of carbon monoxide with macromolecules. Although the use of the cracking products of polymers such as polypropylene or polybutadiene as unsaturated reagents was suggested, this method applies to small molecules (French Pat. No. 1,255,366 filed on Dec. 29, 1959). Another patent (U.S. No. 3,011,984 filed on Mar. 16, 1959) concerning the action produced by a $CO+H_2$ mixture on isobutene-diene copolymers but at a very low unsaturation rate may be cited in this respect. The combination, in the presence of organometallic catalysts, may require a preliminary halogenation of the polymer. This reaction, carried out under the conditions set forth in the last-named patent, leads to hydroxylated substances excluding all other chemical structures.

An article in A.C.S. Polymer Preprints, vol. 6, No. 1, p. 172, April 1965, describes the fixing of an equimolecular mixture $CO+H_2$ on polybutadiene, but this leads to the production of unstable polyaldehydic structures.

SUMMARY OF THE INVENTION

The present invention relates to the preparation of novel macromolecular substances by fixing carbon monoxide on unsaturated ethylenic or aromatic polymers. It is the object of this invention to obtain novel substances by using methods applicable to a complete range of polymers. These novel products are liable in turn to undergo alterations specific of the chemical groups thus grafted to the original chains.

The method of this invention is characterized in that the unsaturated polymer dissolved or dispersed in a carbon monoxide solvent is reacted with carbon monoxide possibly associated with another reagent sheltered from oxygen, and possibly in the presence of a catalyst, the carbon monoxide being introduced into the polymer and solvent mixture kept at a relatively low temperature within the range of $-80°$ C. to $0°$ C. to promote the dissolution thereof, the resulting reaction mixture being subsequently heated to a temperature ranging from $0°$ C. to $240°$ C. under a pressure of 1 to 100 atmospheres to produce the desired reaction.

The method of this invention which permits of producing the chemical modification contemplated comprises various possible forms of embodiment all based on the principles set forth in the following paragraphs A, B, C and D:

(A) The ethylene polymers are reacted with carbon monoxide under pressure (for example 30 to 60 kilograms per square centimeter) in the presence of a mobile hydrogen compound A—H. According to the nature of the radical A, a complete range of products can be obtained, such as carboxylic polyacids (A=OH—), carboxylic acid polyanhydrides (A=R—COO—), polyesters (A=RO—), polyamids (A=$NH_2$—, RNH—), polythioacids (A=—SH), R being an aryl or alkyl radical. The reaction involved requires the presence of catalysts which are then organometallic derivatives.

(B) Macromolecular compounds comprising aromatic nuclei are reacted either with a compound yielding an equimolecular mixture CO+HCL, or with an equimolecular mixture of these two gases prepared separately. This reaction approximates the one known under the name of Gattermann-Koch, but in this case it applies to the preparation of novel products derived from macromolecular substances and carrying aldehyde groups or carboxyl groups resulting from the spontaneous oxidation of the former.

(C) Carbon monoxide is combined with the double bonds included in the chain of ethylene polymers in the presence of substances capable of creating free radicals by opening said double bonds. This radical development may also be obtained by the action of heat or pressure alone. Thus, aldehydic, ketonic or acid compounds are obtained.

(D) Carbon monoxide is combined with the double bonds of certain ethylene polymers, notably those carrying electropositive atom groups such as methyl or phenyl groups, This addition is made in the presence of ionic catalysts such as the halides of amphoteric metals or noble metals, or still in the presence of organic or mineral acids or mineral salts. Thus, aldehydic or acid compounds are obtained according to the nature of the reaction medium.

The present invention proposes different ways of fixing carbon monoxide on unsaturated polymers. These combinations are obtained by leaving unaltered, for the greater part, the molecular magnitude and the shape of the initial macromolecules. In fact, it is known that intrinsic properties of polymers such as elasticity, plasticity, crystallinity, etc., are controlled by these structural factors. As a function of the heat stability and chemical reactivity of each polymer to be modified, the present invention, through the methods broadly set forth in paragraphs (A), (B), (C) and (D) hereinabove, permits of combining carbon monoxide either alone or in admixture with a third compound. Thus, a range of products approximating the initial polymer as to the molecular magnitude are obtained, these products differing however notably as to the chemical reactivity.

According to the nature of the initial polymer utilized as an unsaturated reagent, and as a function of the amount of carbon monoxide used in the combination, whether alone or with a AH or HCl co-reagent, elastomeric, resinous or fibrous products can be obtained. These materials are characterized by a number of improvements concerning notably the following points over non-modified polymers:

Better resistance to the action of solvents and chemicals, notably acids and bases;
Better resistance to aging and deterioration, due to the fixing of chemical groups substituted for double ethylene bonds;

Better adherence of these modified products to textile fibres and various materials (wood, metals, glass, etc.);

Possibility of producing novel chemical reactions, inter alia: the radical or ionic grafting of certain polymers, or still, in the case of polycarboxylic products, the possibility of combining same with mineral cations leading to products comprising reversible or non-reversible bonds, and also the reticulations controlled by polyfunctional substances yielding more regular and stronger vulcanization patterns than those obtained with conventional peroxide or sulphur methods;

Improved compatibility with certain polymers (phenoplast resins, aminoplast resins, polyacrylic resins, polyamid resins, etc.), or fillers (carbon black, silicas, clays);

Improvements in the modules, tensile strength and elongation, among other mechanical properties.

The elastomeric products may be utilized for manufacturing gaskets, packings, protection coatings and as a rule all parts to be used in corrosive or aging media. The resinous products are particularly useful in the field of varnishes and anti-corrosion paints. They are also useful as adherence promoting substances and in the manufacture of glues. The fibres may be used in the manufacture of fabrics to which they impart the above-mentioned improved strength properties and novel possibilities as to cross-linking and adherence-promoting properties.

The carbonylation methods claimed herein are applicable to a great number of unsaturated polymers. The principles set forth in paragraphs (A) and (C) hereinabove imply reactions applicable to the majority of ethylenic macromolecules. Method B is concerned with polymers having an aromatic structure.

These reactions may be carried out on natural polymers (rubber, gutta-percha, terpenic resins, etc.) or on synthetic polymers (polyisoprenes and cis- and trans-polybutadienes, polychloroprene, butadiene-styrolene copolymers, butadiene acrylic nitrile copolymers, isobutylene-isoprene copolymers, ethylene-propylene-diene copolymers, etc.). The carbonylation methods described in this specification are applicable to polymer solutions, but in certain cases they are also applicable to aqueous dispersions of these products, which are usually referred to as latex. Therefore, the possibility of operating either with solutions or with a latex is particularly advantageous. In fact, the polymer may be modified directly upon completion of the polymerization operations without having to isolate it in the dry state. In the case of synthetic polyisoprene or polybutadiene obtained by polymerization in a solvent medium, the carbonylation will apply directly to solutions obtained at the end of the polymerization. Then, the normal steps, such as precipitation and drying, will be carried out on the modified polymers. The modification reaction constitutes a direct link of the chain of conventional preparations, without requiring any profound changes in conventional industrial manufacturing procedures. In the case of polymers obtained in the state of emulsion (polychloroprene, certain polybutadienes or butadiene copolymers), and in the case of natural rubber, the chemical modification may take place in the latex state, the following coagulation and drying steps taking place in a completely conventional manner. The solution processes are also applicable to this type of materials.

Preferably, breaks in the carbohydrate chains as a consequence of the heat treatment generally necessary for producing the reaction should be avoided by operating under shelter from the atmospheric oxygen. According to the quantity of products implemented and the total pressure developed by the reagents, thick-glass reactors or autoclaves may be used. A specific procedure permits of treating latex as the raw material by forming the carbon monoxide within the aqueous dispersion, so that the $CO+H_2O$ elements can be fixed in the form of carboxylic groups.

Solvents suitable for producing the carbon monoxide reactions should meet the following requirements:

They must be good solvents of carbon monoxide and polymers in the case of solution reactions;

They must have sufficient chemical inertia and heat stability under the reaction conditions. Thus, chloroform, carbon tetrachloride, toluene, cyclohexane, decaline, chlorobenzene, butyl acetate, isoamyl acetate, or mixtures such as toluene+acetic acid or anhydride, xylene+acetonitrile, constitute typical examples of solvents meeting these requirements. The concentration rate of dissolved polymer, according to its compatibility with the solvent, ranges from 1% to 15%. In the case of an aqueous dispersion, the latex may contain from 10% to 60% of polymer.

According to the combination procedure contemplated, different catalytic systems pertaining to the following groups are considered as adequate within the scope of this invention:

Organometallic derivatives: carbonyl metals, organic salts of cobalt, copper, manganese, chromium, etc. (case of a type A reaction);

Peroxides: benzoyl peroxide, para-menthane hydroperoxide, α-terpinene endoperoxide, dicumyl peroxide, ditertiobutyl peroxide (case of a type C reaction);

Other free-radical generators: azo-bis (isobutyronitrile), carbamates, halogen derivatives of hydantoin, N-bromoimides (case of a type C reaction);

Metal halides: $AlCl_3$, $CuCl_2$, $ZnCl_2$, $SbCl_3$, $FeCl_3$, $HgCl_2$, $BF_3$ either alone or as a complex with ethylether or acetic anhydride, $PdCl_2$. These catalysts may be activated by the addition of nitrated substances such as nitrobenzene, nitromethane. They can be introduced into the reaction medium in the form of eutectic mixtures ($AlCl_3$-NaCl) stable up to 80° C. but active at the reaction temperatures (case of types D and B reactions);

Mineral acids (HCl, $H_2SO_4$, $H_3PO_4$, etc.) or organic acids (formic acid, acetic acid, trichloroacetic acid) in the case of type D and type B reactions;

Inorganic salts such as $AgNO_3$, AgOCl (case of type D reaction).

In the laboratory, carbon monoxide is obtained by attacking anhydrous sodium formiate with concentrated sulfuric acid. The undesired moisture content of the CO is removed by applying a treatment by means of concentrated $H_2SO_4$, and the $CO_2$ resulting from the oxidation is removed by using soda lime. In the case of reactions involving relatively large quantities of polymers, commercial CO may be used. The equimolecular mixture CO+HCl is prepared by treating chlorosulfonic acid $HSO_2OCl$ by means of concentrated HCOOH. The traces of sulfuric anhydride formed in this case are absorbed by KOH.

The reaction temperatures range from 80° C. to 240° C. and the pressure values from a few atmospheres to 100 atmospheres in the combinations as per paragraphs (A) and (C) of the preamble of this specification. Lower temperatures (for example from 0° C. to 120° C.) and lower pressure values (1 to 50 atmospheres) may be used in the case of combinations B and D carried out in the presence of ionic catalysts.

According to this invention, the general experimental procedure may be summarized as follows:

In a reactor equipped with an agitator, temperature and pressure control means, and a device for introducing compressed or uncompressed gas (nitrogen for scavenging, carbon monoxide alone or in admixture for the reaction), the polymer in the state of a more or less diluted solution, or as a non-aqueous dispersion, is introduced. Then the catalyst is added. The assembly is strongly cooled (0° C. to —80° C.) to increase the carbon monoxide solubility in the medium and the reaction gas is introduced either separately or in admixture with one of the aforesaid third compounds. Having introduced the requisite amount of gaseous reagents, the mixture is heated while stirring. When the reaction is completed the mixture is allowed to cool down to room temperature and the excess carbon monoxide is removed by bubbling nitrogen or carbonic anhydride through the medium. If it is desired to purify the polymer, for example with a view to make analytic assays, the excess catalysts and reagents must be removed. This is obtained by carrying out a series of repeated dissociations and reprecipitations, or alternately by extracting by means of a product not capable of dissolving the modified polymer (water, alcohol, ketone, oil according to cases). The purified material is dried in vacuo until a constant weight is obtained, in the presence of a drying agent (silica gel, calcium chloride) and activated carbon.

In the case of aqueous latex dispersions containing from 10% to 60% of polymers, a solution of a non-ionic surface-tension agent, and possibly a protection colloid, may be added. After allowing to mature during 24 to 48 hours, this latex is stable in an acid medium. Then sodium formiate and subsequently the quantity of sulfuric acid necessary for producing the reaction $$2HCO_2Na + H_2SO_4 \rightarrow 2CO + Na_2SO_4 + 2H_2O$$

are added.

Then the mixture is heated while stirring in an inert (nitrogen) atmosphere. Upon completion of the reaction and the removal of the excess reagents the polymer is coagulated, if necessary, then washed with water in a craping device, and finally dried in an oven at 40° C. in vacuo.

The elementary analysis through conventional methods and notably by determining the oxygen content of the modified polymer permits of calculating the percentage by weight of combined carbon monoxide, together with the fixing rate $n$ ($n$=number of CO or COA groups fixed per 100 elementary patterns of the macromolecular chain). $n$ is calculated from the following relationship.

$$n = \frac{m \times a}{M(100-a)} \times 100$$

wherein:

$a$ = percentage by weight of CO or COA in the modified polymer;
$m$ = mass of elementary pattern of the polyethylenic chain, such as for instance:
  $m = 68$ for polyisoprenes,
  $m = 54$ for polybutadienes;
  $m = 88.5$ for polychloroprenes,
  $M = 28$ for CO, $28+A$ for COA that is:
  $M = 45$ for —COOH,
  $M = 44$ for —CONH$_2$,
  $M = 61$ for —COSH.

To determine the nature and number of combined chemical groups, on the one hand physical methods (infra-red and ultra-violet spectrography) and on the other hand chemical reactions, are resorted to. A typical chemical reaction suitable for this purpose is the determination of the —COOH groups which are measured by using a benzenic solution of potassium methylate.

The following examples should not be construed as limiting the present invention as they are given by way of illustration only and to emphasize certain experimental details. All percentages are by weight.

DESCRIPTION OF THE PREFERRED EMBODIMENTS

Example 1—(Type D reaction)

For modifying only a few grams of polymer, the laboratory apparatus shown in the single figure of the attached drawing is used.

In a two-necked thick-glass flask 1 anhydrous sodium formate is introduced. However, an equivalent amount of formic acid or oxalic acid may be substituted therefor. Dry nitrogen is forced through the assembly to remove any atmospheric oxygen therefrom. A bromine dropping funnel 2 is used for dropwise dispensing concentrated sulfuric acid (density=1.83). A parallel-bladed pincher 3 is provided for regulating the feed rate. The release of CO is facilitated by moderately heating the sodium formate. The released CO flows through two bubblers 4, 4$_1$, the latter containing concentrated H$_2$SO$_4$ to remove the moisture content of the gas. Soda lime and KOH absorbers 5 and 6 are inserted in the circuit for retaining CO$_2$ acid vapors and possibly SO$_3$ acid vapors. Three-way cocks 7, 7$_1$ connect the carbon monoxide generator to a mercury-type measuring Geissler burette 8 (having a capacity of 100 cc.) for performing constant-pressure volumetric measurements; another burette 8$_1$ connected in parallel to the former has its bottom connected through a stopcock to a mercury reservoir 9 movable along a rack (not shown). Having thus obtained the desired volume of gaseous reagent, the latter is directed into a reactor 10 containing the rubber solution and possibly the catalyst. This solution is cooled to —20° C. by a cooling mixture 11 and homogenized by means of a magnetic stirrer 12. The excess CO is collected in an ammonia solution of a CuCl$_2$+NH$_4$Cl+Cu mixture in an absorber 13 connected to a relatively powerful fan system. Before introducing the carbon monoxide the atmospheric oxygen is removed by producing a vacuum over the rubber solution cooled to —80° C. by using carbonic acid snow. Of course, all the conventional cares against the risks of explosion and intoxication by carbon monoxide should be taken during these operations.

The solution utilized in the process contains 5.8 g. of natural rubber dissolved in anhydrous chloroform, and 0.250 g. of sublimated AlCl$_3$ forming a complex with 10 cc. of nitromethane. This solution is saturated with carbon monoxide and the reactor is then sealed and heated during 150 minutes at 60° C. The polymer is then precipitated with ketone and extracted by using the same solvent. The elementary analysis of the reaction product shows a 4.15% oxygen contents (with due regard for the 0.8% oxygen contents of a reference rubber). The spectrographic infrared analysis shows 3.7 and 5.8 $\mu$ absorption characteristics of —CHO groups. This oxygen content corresponds to a 7.5% carbon monoxide combination, that is, a value of:

$$n = \frac{68 \times 7.5}{29(100-7.5)} \times 100 - 19$$

The thus modified rubber is soluble in aromatic compounds and esters. A 1% xylene solution of this modified polymer heated under reflux conditions in the presence of benzidine will form a gel within 12 minutes, which denotes a reticulation by medium of the CHO groups.

A identical test carried out under pressure in the presence of a considerable excess of carbon monoxide (248 cc. for 0.1 g. of rubber and in a chlorobenzene solution under the following conditions: introducing CO at —40° C., reaction time=4 hours at 89° C.) gives the following results: C=80.03%; H=10.35%; O=9.82%; combined CO=17.7%. The product then occurs in the form of thermo-plastic fibres.

A reaction of the same type may be carried out from a synthetic polyisoprene having a high content of cis-1.4 form. After a ketone extraction step this polymer is dissolved in anhydrous toluene by reason of 1.5 g. per 150 cc. of solvent. Then 0.045 g. of PdCl$_2$ are added as catalyst. The solution is then cooled to —20° C. and about 1.5 g. of CO are introduced. After heating during 4 hours at 80° C. a modified polymer comprising aldehydic groups is obtained. In this case the combined CO content calculated by analysis, is 3.7% (O=2.45%).

Example 2—(Type D reaction)

The same apparatus and procedure as in Example 1 are used.

2 g. of rubber are dissolved in 100 cc. of toluene containing 2% of water. 0.200 g. of the NaCl-AlCl$_3$ eutectic mixture are added and then 250 cc. of gaseous carbon monoxide are introduced. After heating during 8 hours at 89° C. the polymer is precipitated no more by the ketone but only by aliphatic alcohols such as methanol or ethanol. The oxygen content (3.51%), the proportion of acid functions by NaOH as well as the infra-red spectrography (peaks at 3, 5.6, 8.5, 5.9$\mu$) show the fixing of carbon monoxide in the form of carboxylic groups (4.90% of COOH, that is $n=7.8$). The thus modified polymer is soluble in dioxane and methylethylketone. It can be reticulated by heating by means of ethylene-glycol in the presence of a trace of sulfuric acid.

Example 3—(D type reaction)

The same procedure and apparatus are used. The catalyst is BF$_3$-acetic anhydride complex (1% in relation to the rubber). A toluene solution of synthetic polyisoprene having a majority of cis-1.4 forms is saturated with carbon monoxide. After heating two hours at 100° C., the product is precipitated by using methanol containing 0.5% of anhydrous CaCl$_2$. The oxygen content (2.28%) corresponds to the fixing of 4.1% of the CO ($n=10$) in the form of aldehyde groups.

Example 4—(Type D reaction)

Experiments made from synthetic polymers gave the following results:

2% polymer solution in chlorobenzene saturated with carbon monoxide at −20° C. and containing 2% of water.

Catalyst: AlCl$_3$ in NO$_2$CH$_3$ (3% of AlCl$_3$ with respect to the polymer).

Reaction time: 5 hours at 85° C. 1.4 cis-polybutadiene; combined CO=5.2%; $n=6.6$; 1.4 trans-polychloroprene; combined CO=4.3%; $n=8.8$; isobutylene (96.5%)-isoprene (3.5%) copolymer; combined CO=2.9%.

Example 5—Type C reaction

The carbon monoxide is combined with natural rubber by means of a radical reaction. The natural rubber is dissolved (1%) in CO-saturated chlorobenzene. The content of free-radical donor is 1% of the rubber content. The reaction time is 5 hours at 80° C. According to the free-radical donor, the following figures are obtained: Paramenthane hydrogen peroxide, combined CO=5.3%; $n=13.1$; ditertiobutyl peroxide, combined CO=4.3%; $n=10.6$; chlorobromodimethylhydantoin, combined CO =6.2%; $n=14.5$.

Under the same conditions, benzoyl peroxide yields a fixing rate $n=10.6$ (combined CO=4.3%).

Example 6—(Type A reaction)

2 g. of natural rubber are dissolved in a mixed toluene (200 cc.) and acetic anhydride (40 cc.) solution. 0.06 g. of cobalt naphthalene are added, then at 40° C. 140 cc. of carbon monoxide are added. Reaction time=4 hours at 90° C. The polymer is collected by evaporating the solvent: O=4.68%; combined CO=8.4%.

Example 7—(Type A reaction)

In another experiment 2 g. of rubber are dissolved in 200 cc. of chlorobenzene in the presence of cobalt naphthalene (3% of the rubber). The solution is saturated with gaseous SH$_2$, then with CO (bath temperature=−25° C. during these dissolutions). The mixture is stirred during 4 hours at room temperature and then heated during 5 hours at 60° C. A completely gelled product is obtained of which the combined sulfur content (2.10%) shows the fixing of 1.9% CO in the form of —COSH groups. The gelling produced during the reaction proves the existence of these thioacid groups. In fact, these groups can produce bridging between the rubber chains after a radicalary dissociation.

Example 8—(Type A reaction)

2 g. of rubber are dissolved in 200 cc. of chlorobenzene in the presence of 3% of cobalt naphthalene. At −30° C. this solution is saturated with gaseous carbon monoxide. The solution is stirred at room temperature and then cooled to −50° C. Then 4.3 cc. of water are injected and the mixture is heated to 110° C. during five hours. The oxygen content of the modified polymer (2.77%) corresponds to 3.9% of —COOH groups fixed to the rubber chain.

Example 9—(Type D reaction)

A rubber solution in carbon tetrachloride is prepared. A AgNO$_3$ solution in dioxane is added to the thereto and the mixture is heated during 3 hours at 60° C. The (C$_5$H$_8$)/$_n$NO$_3$Ag complex thus obtained gives the following analytical results: C=24.48%; H=2.08%; inorganic residue=68.7%. This complex is dissolved in chlorobenzene and the solution saturated with CO. Reaction time=4 hours at 80° C.; thus, the following results are obtained: C=84.16%; H=10.82%; O=6%; combined CO=10.8%.

Example 10—(Type D reaction in aqueous dispersion)

A natural rubber latex is diluted to a 10% rubber concentration by adding distilled water. It is subsequently neutralized to pH=7 by adding an aqueous 30% formaldehyde solution; the purpose of this step is to eliminate the ammonia utilized as a dispersion stabilizer. Then a 20% aqueous solution of a non-ionic emulsifier is added.

In a pressure-resisting reactor 50 cc. of this latex, 4 g. of sodium formiate and 10 cc. of 30% sulfuric acid are introduced. The atmospheric oxygen is removed by bubbling gaseous nitrogen and the mixture is heated during 2 hours at 80° C. The resulting polymer is fractionated, washed in a craper to neutrality. After drying during 48 hours at 40° C. in a vacuumized stove, the modified rubber contains 6.74% of oxygen, that is, 12.1% of carbon monoxide combined in the form of —COOH groups.

Example 11—(Type D reaction in aqueous dispersion)

Random-structured polybutadiene latex containing about 33% of dry rubber stabilized by means of resinates and protected by polyphosphites (0.5%) is used. This latex is diluted to one-tenth and then stabilized by adding a non-ionic surface-tension agent by reason of 5% of this agent in relation to the dry rubber. The stabilization is carried out 24 hours before the reaction.

1,000 cc. of this latex are introduced into an autoclave equipped with a shaker. A nitrogen stream is forced therethrough and then 60 cc. of ⅓ sulfuric acid and 25 g. of sodium formiate are added. The autoclave is heated during 2 hours to 80° C. (this temperature being reached after about 40 minutes). The mixture is allowed to cool and another nitrogen stream is forced through the autoclave. The latex is poured into five time its volume of ethanol, thus producing a very slow deposit of fine rubber-like particles. These particles are separated by filtration, washed firstly with water and then with ketone. After drying, a modified polymer having become insoluble at room temperature and having the following composition: C=56.46%; H=7.42%; O=6.63%; Na=10.1% is obtained. Infra-red spectrographic analysis shows 8.8 and 9.2$\mu$ absorptions ascribable to aliphatic ether bonds or to carboxylate groups.

The combined sodium may be eliminated by treating at 110° C. a toluene solution of this polymer with 2.5 N hydrochloric acid. The novel polymer thus obtained has the following composition: C=84.84%; H=10.16%; O=4.18%.

Its appearance is not pulverulent but rubber-like, and it is cold soluble.

Example 12—(Type B reaction)

In the apparatus illustrated in the drawing an equimolecular CO+HCl mixture is prepared by causing concentrated formic acid (d=1.22, 6 cc.) to act upon chlorosulfonic acid (d=1.76; 8 cc.) at room temperature. The gaseous mixture is collected directly in the reactor without passing through the mercury measuring burette.

2 g. of butadiene (76.5%)-styrolene (23.5%) copolymer are dissolved in 200 cc. of cyclohexane in the presence of 0.7 g. of an equimolecular mixture $AlCl_3+CuCl_2$. The atmospheric oxygen is removed, the solution is saturated by the gaseous mixture and then heated during 6 hours at 60° C. After purification, the resulting polymer has the following composition: C=78.24%; H=8.70%; O=7.1%.

A small quantity of this polymer (about 15%) gelled during the reaction.

An acid dosing by using alcohol potash shows an acid number of 7.15 (number of potash mg fixed per gram of product), thus proving that one fraction of the carbon monoxide was combined in the form of —COOH groups. This acid number rises to 10.1 when a benzene solution of the polymer, saturated with water and containing $Cu++$ ions, is stirred during 24 hours. This action corresponds to an oxidation of the aldehyde groups into —COOH.

What we claim is:

1. A method of modifying natural rubber which comprises reacting said rubber with a mixture of carbon monoxide and a co-reactant having the formula AH, wherein A is a radical selected from the group consisting of OH—, R—COO—, RO—, $NH_2$—, RNH— and —SH, R being an alkyl or aryl radical, in an inert atmosphere at a temperature of about 60° C. to 240° C., at a pressure of about 1 to 100 atmospheres, and in the presence of catalyst selected from the group consisting of carbonyls and organic salts of cobalt, copper, manganese and chromium, said rubber being in admixture with a solvent for carbon monoxide in a concentration of 1% to 60% based on the weight of said mixture, the carbon monoxide being introduced into said mixture until the solution is saturated therewith at a temperature ranging from about —80° C. to 0° C. to promote the dissolution thereof, and the reaction mixture thus obtained being subsequently heated to a temperature ranging from about 60° C. to 240° C. in a sealed reactor to product the modified rubber.

2. A process according to claim 1, in which said catalyst is cobalt naphthenate.

3. A process according to claim 1, in which said co-reactant is selected from the group consisting of hydrogen sulfide, acetic anhydride and water.

4. A process according to claim 1, in which said rubber is in a solution of said solvent in a concentration of about 1% based on the weight of said solution, in which said co-reactant is acetic anhydride which is present in an amount of about 20 parts by volume per 100 parts by volume of said solvent and in which said catalyst is cobalt naphthenate which is present in an amount of about 3% by weight based on the weight of said rubber.

5. A process according to claim 1, in which said rubber is in a solution of said solvent in a concentration of about 1% based on the weight of said solution, in which said co-reactant is hydrogen sulfide which is introduced at about the same temperature as the introduction of carbon monoxide in an amount sufficient to saturate the solution, and in which the catalyst is cobalt naphthenate which is present in an amount of about 3% by weight based on the weight of said rubber.

6. A process according to claim 1 in which said rubber is in a solution of said solvent in a concentration of about 1% based on the weight of said solution, in which said co-reactant is water which is present in an amount of about 2 parts by volume per 100 parts by volume of said solvent and in which said catalyst is cobalt naphthenate which is present in an amount of about 3% by weight based on the weight of said rubber.

7. A method according to claim 1 in which said rubber is in a solution of said solvent for carbon monoxide, the concentration of said rubber being about 1% to 15% based on the weight of said solution.

8. A method according to claim 1 in which said rubber is in a dispersion of said solvent for carbon monoxide, the concentration of said rubber being about 10% to 60% based on the weight of rubber and solvent.

9. Natural rubber modified by carbon monoxide and a co-reactant having the formula AH, wherein A is a radical selected from the group consisting of OH—, R—COO—, RO—, $NH_2$—, RNH— and —SH, R being an alkyl or aryl radical, obtained by the method set forth in claim 1.

References Cited

UNITED STATES PATENTS

| | | |
|---|---|---|
| 3,311,598 | 3/1967 | Mertzweiller et al. 260—94.7 XR |
| 3,334,076 | 8/1967 | Mertzweiller et al. |
| 3,337,489 | 8/1967 | Cull et al. |
| 3,383,426 | 5/1968 | Cull et al. |
| 2,495,286 | 6/1949 | Brubaker _____ 260—63 |
| 3,376,362 | 4/1968 | Bearden et al. ____ 260—63 XR |
| 3,427,364 | 2/1969 | Shaw et al. _____ 260—94.7 XR |

JOSEPH L. SCHOFER, Primary Examiner

W. F. HAMROCK, Assistant Examiner

U.S. Cl. X.R.

260—29.7, 63, 80.7, 83.3, 85.1, 85.3, 92.3, 93.5, 94.7